United States Patent [19]

Arpin

[11] 4,453,876
[45] Jun. 12, 1984

[54] FIREPLACE LOG AND COAL FEEDER

[76] Inventor: Julien J. Arpin, R.F.D. #2, Box 229, Lisbon, Conn. 06351

[21] Appl. No.: 263,687

[22] Filed: May 14, 1981

[51] Int. Cl.³ .......................... B62B 1/02; B62B 1/16
[52] U.S. Cl. ................................ 414/183; 414/182; 414/188; 414/192; 414/207; 414/717; 414/490; 414/469; 298/2
[58] Field of Search ............... 414/180, 182, 183, 188, 414/192, 199, 207, 160, 680, 717, 745, 490, 476, 469, 167; 298/2

[56] References Cited

U.S. PATENT DOCUMENTS

| | | | |
|---|---|---|---|
| 2,458,195 | 1/1949 | Pearse | 414/716 |
| 2,998,151 | 8/1961 | Sampson | 414/490 |
| 3,033,398 | 5/1962 | Carroll | 414/476 |
| 3,362,554 | 1/1968 | Fortier | 414/717 |
| 3,477,598 | 11/1969 | Hassell et al. | 414/452 |

Primary Examiner—Bruce H. Stoner, Jr.
Assistant Examiner—James E. Barlow

[57] ABSTRACT

Apparatus for delivering solid fuel into a fireplace safely and easily includes a fuel supporting rack which may be pivoted between a horizontal fuel supporting position to a downwardly angled unloading position by means of a control lever having its operating end positioned a substantial distance from the fireplace.

7 Claims, 4 Drawing Figures

FIREPLACE LOG AND COAL FEEDER

BACKGROUND OF THE INVENTION (1) Field of the Invention

The present invention relates to a device for the transporting of solid fuel, such as wood logs or coal, to a fireplace and for the subsequent feeding of the fuel into a fireplace. Specifically, the present invention relates to a fireplace log and coal feeder which facilitates the transport of such solid fuel to a conventional fireplace and permits the easy and safe unloading of the logs or coal into the fireplace. The present invention has a forward section which may be tilted downwardly from a fuel carrying position, by manipulating a lever from a latched condition to thoroughly spill the solid fuel into the fireplace. Accordingly, the general objects of the present invention are to facilitate and enhance the safety of the transport to and subsequent feeding into a conventional fireplace of solid fuel.

(2) Description of the Prior Art

The customary prior art method of feeding logs or coal into a fireplace involves the physical carrying of the fuel to the fireplace followed by the delivery of the logs or coal into the fireplace by an individual. This method subjects the individual to the danger of injury to person or property during movement of the fuel to the vacinity of the fireplace and the risk associated with being exposed to the fire within the fireplace. The latter may result in the individual receiving burns through contact with material ejected from the fireplace when additional fuel is added to the fire. Furthermore, the prior art method, which requires that the individual come into actual physical contact with the wood logs during carrying the same may result in injury or discomfort to the individual through such diverse causes as splinters, accidental dropping and insect bites.

Some of the objects of the present invention are to allow the user of a conventional fireplace to transport and feed logs and coal into the fire without the disadvantages of the prior art methods.

SUMMARY OF THE INVENTION

The present invention overcomes the above-discussed disadvantages and other deficiencies of the prior art by providing a novel device for transporting and feeding solid fuel to a conventional fireplace and for subsequently causing, from a remote location, the fuel to be delivered into the fireplace.

A fireplace log and coal feeder in accordance with the present invention includes a stand which may be moved to and from the fireplace. To facilitate this movement, the stand is provided with two wheels attached to an axle. A stationary leg is positioned forward of the wheel and axle assembly in order to maintain the fireplace log and coal feeder in an upright position while unloading the log or coal into the fireplace. The stand further includes a support arm assembly from which a fuel support or rack is mounted. This rack may be easily tilted so as to unload the log or coal into the fireplace.

The stand is provided with a lever which allows the user to control the tilting of the rack. The stand is further provided with a locking mechanism which enables the user to lock the rack in an upright position. Both the lever and the locking mechanism are accessible to the user at a point spaced a safe distance from the fireplace thereby allowing for easy and safe control of the unloading of the logs or coal into the fireplace.

Both the support arm assembly and the stationary leg may be raised or lowered relative to the remainder of the stand in order to adjust the height of the present invention. The height adjustment enables the fireplace log and coal feeder to be used with various types and sizes of fireplaces. Also, the angular position of the rack and support arm assembly may be adjusted in a horizontal plane relative to the remainder of the apparatus.

The present invention provides numerous objects and advantages over the prior art, some of which are to allow the users of conventional fireplaces the easy transport and feeding of either logs or coal into their fireplace.

BRIEF DESCRIPTION OF THE DRAWINGS

The present invention may be better understood and its numerous objects and advantages will become apparent to those skilled in the art by reference to the accompanying drawing wherein like reference numerals refer to like elements in the several FIGURES and in which:

FIG. 3 is a partial top view of the apparatus of FIG. 2; and

DESCRIPTION OF THE PREFERRED EMBODIMENT

Figure 1:
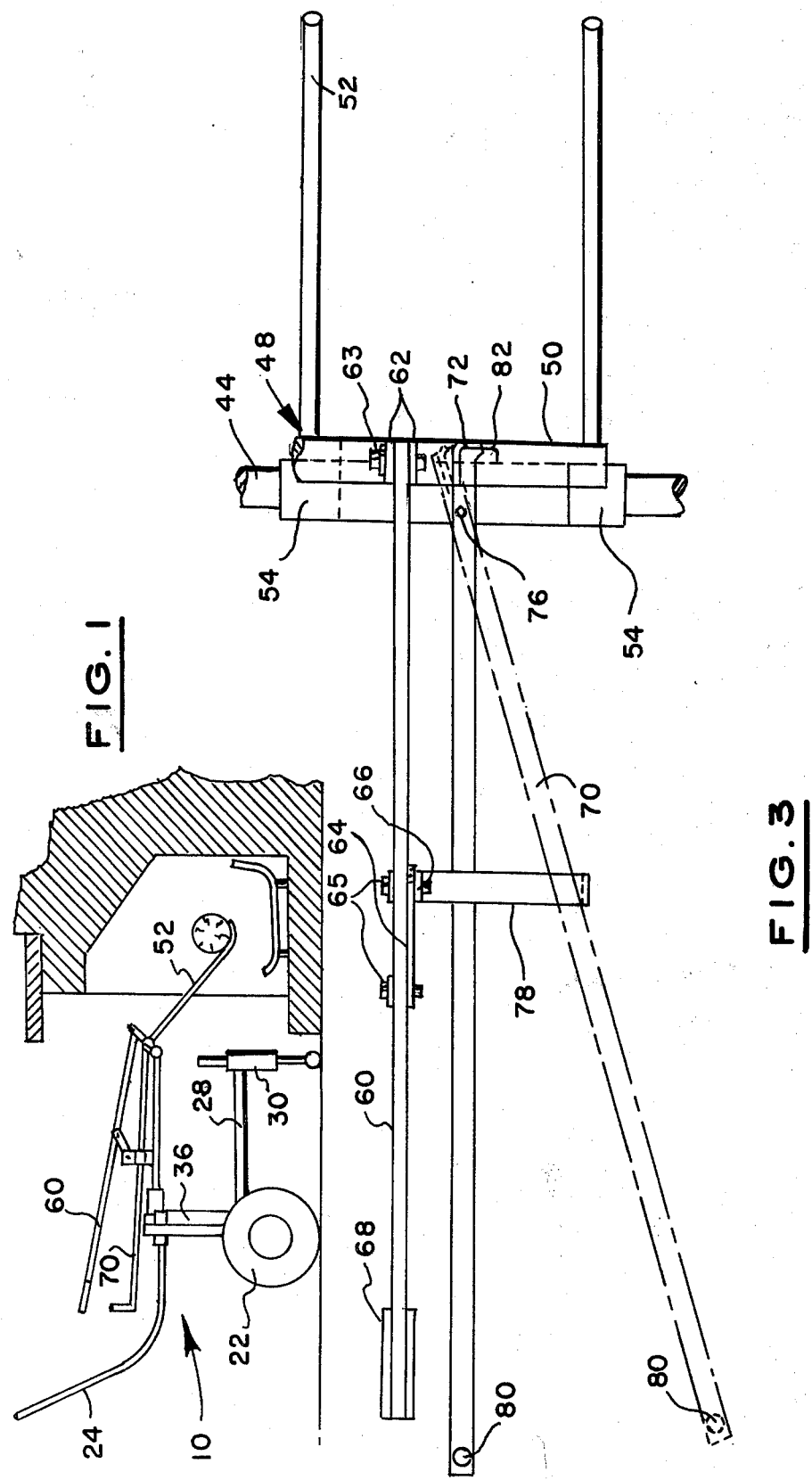
FIG. 1 is a side view of a preferred embodiment of the present invention schematically illustrating its use with a conventional fireplace.

Referring to FIG. 1, a preferred embodiment of the fireplace log and coal feeder stand of the present invention is indicated schematically and generally at 10. FIG. 1 illustrates the unloading state of feeder stand 10 and shows the stand in use with a conventional fireplace.

Figure 2:
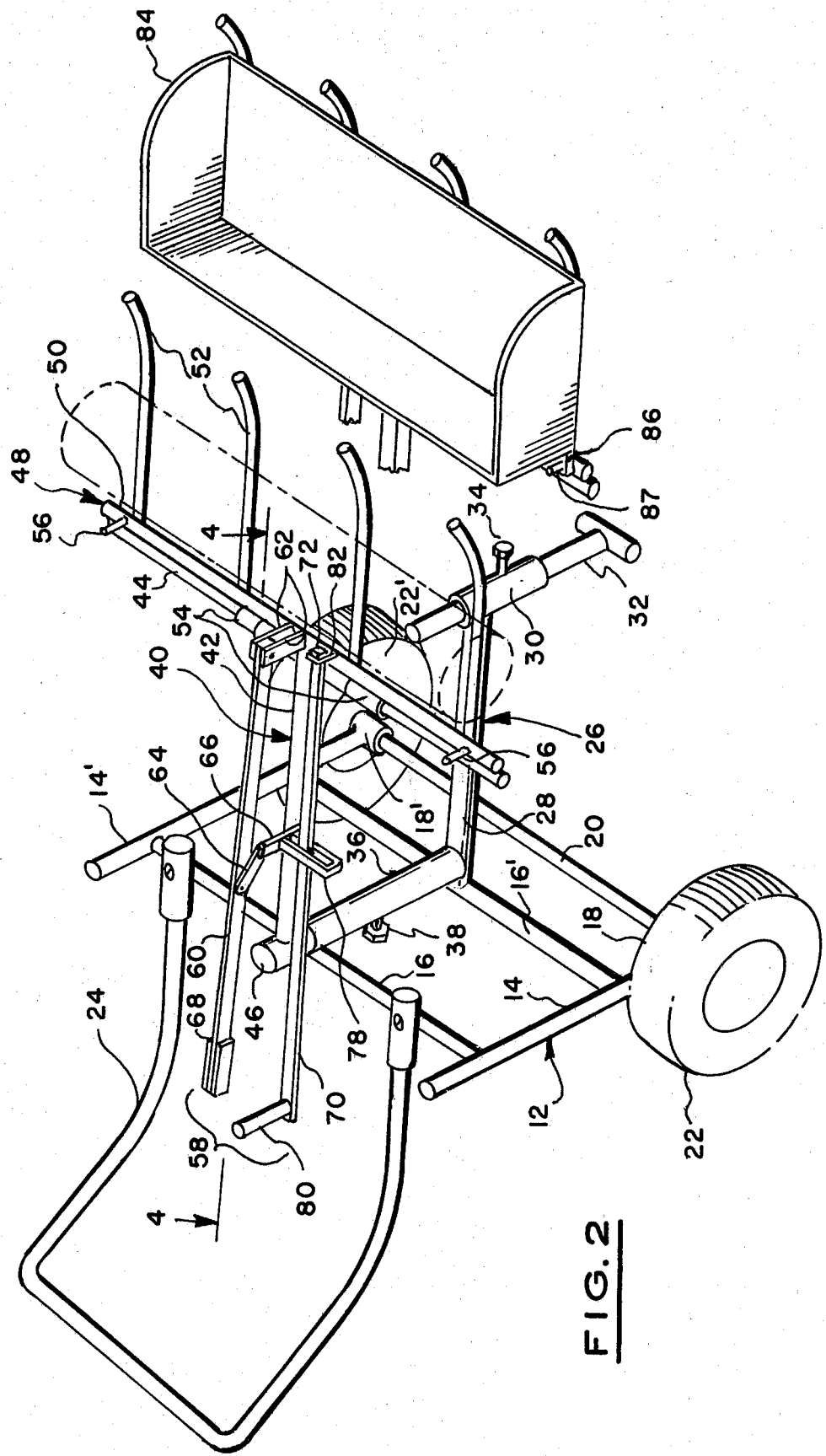
FIG. 2 is a perspective view of the embodiment of the present invention illustrated in FIG. 1.

Referring now to FIG. 2, a perspective view of feeder stand 10 is shown. Feeder stand 10 has, as its principal supporting structure, frame 12. Frame 12 is constructed with at least two vertical rods 14 and 14' which are interconnected by at least two horizontal rods 16 and 16'. Located at the bottom of both of vertical rods 14 and 14' are axle collars 18 and 18'. An axle 20 passes through both of axle collars 18 and 18'. Axle 20 has a diameter which is slightly less than the inner diameter of axle collars 18 and 18'. Wheels 22 and 22' are attached to opposite ends of axle 20. Wheels 22 and 22' may be comprised of any suitable material and are preferably formed of a material, such as rubber, which will not damage a wooden floor. Wheels 22 and 22' may be either permanently or temporarily affixed to axle 20. Axle 20 and wheels 22 and 22' impart mobility to feeder stand 10.

An upwardly curving handle 24 is attached to horizontal rod 16. Handle 24 may have any desired shape, with the preferred embodiment being a U-shape. Handle 24 is fastened to horizontal rod 16 by any known method, such as by welding, bolting or by being received and subsequently pinned in sockets affixed to rod 16 as shown. Handle 24 functions as a lever which allows the user to control the moving of feeder stand 10.

A leg assembly, indicated generally at 26, is attached to horizontal rod 16' and extends forwardly therefrom. Leg assembly 26 is comprised of a lower bar 28 which has first and second ends. The first end of leg bar 28 is secured to horizontal rod 16' by any manner, such as by welding. The second end of leg bar 28 is secured to a pedestal sleeve 30 by any manner, such as by welding. Pedestal sleeve 30 is oriented perpendicularly with respect to bar 28 and is in the form of a hollow open-ended cylinder. Pedestal sleeve 30 receives a T-shaped pedestal 32. Pedestal 32 has a slightly smaller diameter than the inner diameter of pedestal sleeve 30 which allows for the vertical adjustment of the cross-member of the pedestal relative to the lower end of sleeve 30. Pedestal sleeve 30 is further provided with locking screw 34. Locking screw 34 passes through the wall of pedestal sleeve 30 and can be made to contact spaced detents or apertures in pedestal 32. Locking screw 34 will preferably be provided with a male thread compatible with a female thread which has been tapped through the wall of pedestal sleeve 30. This allows locking screw 34 to be held at any desired length within pedestal sleeve 30. By increasing the length of locking screw 34 within pedestal sleeve 30 the end of locking screw 34 will be caused to engage pedestal 32 to secure pedestal 32 at a desired position within pedestal sleeve 30 thereby selectively adjusting the length of the stationary leg of the apparatus.

As noted, the first end of leg bar 28, is affixed to horizontal rod 16. Tubular support 36 extends upwardly from bar 28 at a point adjacent to the said first end thereof. Tubular support 36, which is also an open-ended hollow cylinder, is sized to receive a support post 46 of a support arm assembly which is indicated generally at 40. Support post 46 has a diameter slightly less than the inner diameter of support 36. Support 36 is also provided with locking bolt 38 which has similar design and function to that of previously mentioned locking screw 34. This allows support post 46 to be held in any desired position within support 36. Accordingly, the height of the load to be carried by the apparatus may be selectively adjusted by means of screws 34 and 36.

Support arm 40 is further comprised of a forwardly extending bar 42. Bar 42 is attached, at its first end, to support post 46 by any method, such as by welding. The other end of bar 42 is affixed to a transversely oriented feeder support rod 44 at the mid-point of rod 44. Rod 44, in the disclosed embodiment, is positioned directly above pedestal 32.

Figure 4:
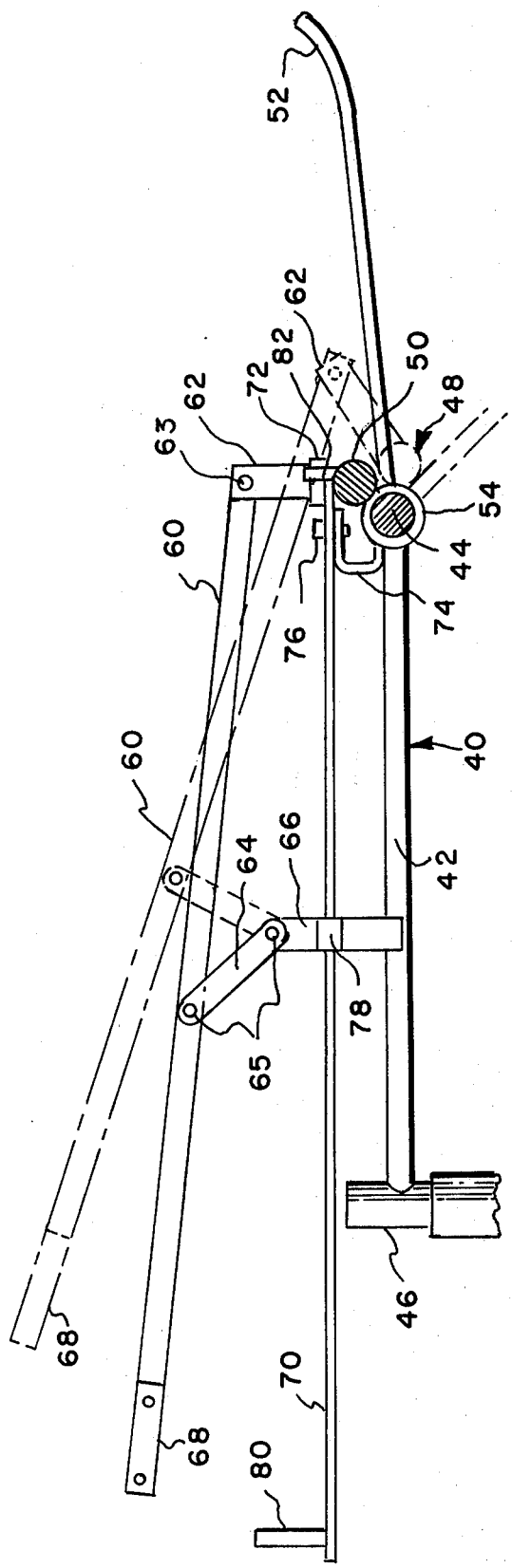
FIG. 4 is a partial side elevation view taken along line 4—4 of FIG. 2.

A feed rack, indicated generally at 48, is mounted upon support rod 44. Feed rack 48 includes a pivotal rod 50. Rod 50 is rigidly secured to at least two feeder support collars 54, by any known method, such as by welding. Feeder support collars 54 are hollow cylinders which fit loosely around feeder support rod 44. This allows feed rack 48 to be rotated about feeder support rod 44. Feed rack 48 is further comprised of at least two load support arms 52. Arms 52 are attached to pivotal rod 50. At least two coal pan posts 56 are also attached to rod 50. Posts 56 are perpendicular to arms 52. To control the rotation of feed rack 48 about feeder support bar 44, feeder stand 10 is provided with a control mechanism 58. FIGS. 3 and 4 illustrate enlarged views of control mechanism 58 and will now be referred to to explain mechanism 58.

Control mechanism 58 is comprised of a tilt control lever 60 and a locking control member 70. Tilt control lever 60 controls the downward tilt of feed rack 48. Tilt control lever 60 is mounted between a pair of upstanding arms which define a hinge joint or pivot 62 which is attached to feeder rod 50. Tilt control lever 60 is held loosely in place within hinge joint 62 by bolt 63. Tilt control lever 60 is further held in position by an articulated bracket which includes members 64 and 66. Bracket member 64 is affixed at a first end to lever 60 by a pivot connection. Member 64 is also pivotally coupled to member 66 by a bolt 65. Member 66 is rigidly fastened to bar 42 of support arm 40 by any method, such as by welding. A handle 68 is fastened to a second end of tilt control lever 60.

Locking control member 70 of control mechanism 58 is in the form of an elongated arm which has first and second ends. The first end of locking member 70 is pivotally secured to a base bracket 74 by pin 76. This allows locking member 70 to rotate freely about pin 76. A projection 72 is secured permanently to the first end of locking member 70, and extends transversely thereto, to define an L-shaped latch. L-shaped latch 72 is positioned on the first end of locking member 70 so that it may be caused to engage a forwardly facing surface of a flange 82. Flange 82 is permanently secured to feeder rod 50 of feed rack 48 by any method such as welding. When L-shaped latch 72 is in contact with flange 82, feed rack 48 is locked into an upright position. With the rack 48 locked, as shown in solid lines in FIGS. 1, 2 and 3, logs which have been placed upon feeder arms will remain in place.

Locking member 70 is further positioned within a guide 78. Guide 78 restrains the lateral movement of locking member 70 in a single plane. Guide 78 is permanently secured to bar 66 by any known method such as by welding. Preferably, guide 78 is rectangular in shape. A handle 80 is provided at the second end of locking member 70. Handle 80 allows the user of feeder stand 10 to pivot locking member 70 about pin 76 and thus engage or disengage latch 72 from flange 82.

Referring again to FIG. 2, one embodiment of a coal pan for the present invention is indicated generally at 84. This coal pan is used with the present invention when it is desired to burn coal instead of logs. Coal pan 84 is positioned atop feeder arms 52. Coal pan 84 is provided with eyelet defining projections 86. Projections 86 are fastened to pan 84 by any known method, such as welding. Projections 86 are provided with apertures 87 which have a diameter slightly larger than coal pan posts 56. Coal pan 84 is held in position by placing coal pan posts 56 within aperatures 87 of projections 86 and inserting pins, or other securing means, not shown, through posts 56. This prevents coal pan 84 from falling off arms 52 when feed rack 48 is tilted downward.

The operation of feeder stand 10 involves positioning either a wooden log upon arms 52 or coal within coal pan 84. Feeder stand 10 is then rolled into position in front of a conventional fireplace, such as illustrated in FIG. 1, so that the log or coal may be fed into the fireplace. Support arm assembly 40 may be rotated laterally in any direction; i.e., post 46 may be rotated about its axis in support 36; to help facilitate the discharging of the log or coal into the fireplace. In order to tilt feed rack 48, the user first disengages projection 72 from flange 82 by pivoting locking control member 70 in a counterclockwise direction. Next the handle 68 on tilt control arm 60 is raised causing feed rack 48 to tilt downwardly and deliver either the log or coal into the fireplace.

The present invention may include a cam device, not shown, which is activated by tilt control lever 60 to help dislodge a log from arms 52 into the fireplace; such a cam device "bumping" the log from below either as the rack tilts downwardly or in place of the downward tilt.

While a preferred embodiment has been shown and described, various modifications and substitutions may be made thereto without departing from the spirit and scope of the invention. Accordingly, it is to be understood that the present invention has been described by way of illustration and not limitation.

What is claimed is:

1. Apparatus for use in the delivery of solid fuel into a fireplace comprising:
    support means including frame means defining a first plane, means attached to said frame means for facilitating the movement thereof including at least a pair of surface contacting rolling members, handle means coupled to said frame means for providing control over the movement of said frame means, and support arm means defining a second plane which intersects said first plane, said support arm means having first and second ends coupled to said frame means for movement therewith, said support arm means second end being pivotally attached to said feeder means, the axis about which said feeder means is rotatable being perpendicular to said second plane;
    feeder means including a fuel support and being pivotally attached to said support means, said feeder means being rotatable about an axis and having at least first and second operating positions, said first position of said feeder means providing stable support for the fuel, said second position of said feeder means discharging the fuel from said feeder means into a fireplace under the influence of gravity;
    elongated control lever means having first and second ends, said first end being continuously coupled to said feeder means whereby raising of said second end of said control lever means moves said feeder means between said first and said second operating positions and lowering of said control lever means moves said feeder means between said second and said first operating positions;
    leg means having first and second ends, said leg means first end being secured to said support arm means, said leg means extending from said support arm means to support said apparatus on the surface engaged by said rolling members via contact between said leg means second end and the surface; and
    lock means pivotally attached to said support arm means and having first and second positions, said lock means retaining said feeder means in said first operating position when in said first position, said lock means further including flange means affixed to said feeder means and defining a locking surface, an elongated arm having first and second ends and being pivotally coupled to said support arm means, a projection extending from said first end of said elongated arm, said projection being engageable with said locking surface when said lock means is in its first position, and means for constraining the motion of said elongated arm to a plane generally perpendicular to said second plane.

2. The apparatus of claim 1 wherein said leg means is telescoping.

3. The apparatus of claim 2 wherein said support arm means is pivotally connected to said frame means whereby said angle of intersection between said first and second planes may be varied.

4. The apparatus of claim 3 wherein said support arm means includes:
    telescopic coupling means for connecting said support arm means to said frame means.

5. The apparatus of claim 4 wherein said feeder means comprises:
    a first bar;
    a second bar rigidly fixed to said support arm means, said first and second bars being parallel and being oriented perpendicularly to said second plane;
    means coupling said first bar to said second bar whereby said first bar may rotate about the axis of said first bar;
    a plurality of tines extending from said first bar and being generally transverse to the axis thereof, said tines being parallel to one another and cooperating to define a log supporting surface; and
    means connecting said first bar to said control lever means first end whereby movements of said control lever will cause rotation of said first bar.

6. The apparatus of claim 5 further comprising:
    pan means adapted to receive and hold particulate type of fuel and having a pouring lip at a first side thereof; and
    means for removably installing said pan means on said feeder means whereby said pan means will move with said feeder means to release particulate fuel therefrom when said feeder means is in the second position.

7. The apparatus of claim 6 further comprising:
    extendable bracket means having first and second ends, said first end of said bracket means being secured to said control lever means, said second end of said bracket means being secured to said support arm means, said bracket means constraining the movement of said control lever means to a plane parallel to said second plane.

* * * * *